(12) United States Patent
Takeuchi et al.

(10) Patent No.: US 12,717,106 B2
(45) Date of Patent: Aug. 25, 2026

(54) MODULES FOR SPLICED CABLE CONNECTIONS

(71) Applicant: Go!Foton Holdings, Inc., Somerset, NJ (US)

(72) Inventors: Kenichiro Takeuchi, North Brunswick, NJ (US); David Zhi Chen, Dallas, TX (US)

(73) Assignee: Go!Foton Holdings, Inc., Somerset, NJ (US)

( * ) Notice: Subject to any disclaimer, the term of this patent is extended or adjusted under 35 U.S.C. 154(b) by 313 days.

(21) Appl. No.: 18/379,430

(22) Filed: Oct. 12, 2023

(65) Prior Publication Data

US 2024/0151923 A1 May 9, 2024

Related U.S. Application Data

(60) Provisional application No. 63/423,991, filed on Nov. 9, 2022.

(51) Int. Cl.
*G02B 6/00* (2006.01)
*G02B 6/44* (2006.01)

(52) U.S. Cl.
CPC .................................. *G02B 6/4454* (2013.01)

(58) Field of Classification Search
CPC .. G02B 6/4454; G02B 6/44465; G02B 6/445; G02B 6/44528; G02B 6/4455; G02B 6/00
See application file for complete search history.

(56) References Cited

U.S. PATENT DOCUMENTS

| | | | |
|---|---|---|---|
| 5,774,618 A | 6/1998 | Jones | |
| 5,886,300 A | 3/1999 | Strickler | |
| 6,037,544 A | 3/2000 | Lee et al. | |
| 10,663,684 B2 * | 5/2020 | Claessens | G02B 6/445 |
| 2006/0067636 A1 | 3/2006 | Bludau et al. | |
| 2011/0280525 A1 | 11/2011 | Marcouiller et al. | |
| 2015/0117829 A1 * | 4/2015 | Allen | G02B 6/4454 385/135 |
| 2016/0116697 A1 | 4/2016 | Kostecka et al. | |
| 2016/0139341 A1 * | 5/2016 | Morioka | G02B 6/3803 385/56 |
| 2018/0335595 A1 | 11/2018 | Takeuchi et al. | |
| 2020/0073070 A1 | 3/2020 | Schoenfelder et al. | |
| 2020/0301074 A1 | 9/2020 | Islam | |

(Continued)

FOREIGN PATENT DOCUMENTS

| | | |
|---|---|---|
| CN | 216646911 U | 5/2022 |
| EP | 1557705 A1 | 7/2005 |

(Continued)

OTHER PUBLICATIONS

Japanese Office Action for Patent Application No. 2023-190877, dated Oct. 11, 2024, 5 pages.

(Continued)

*Primary Examiner* — Jennifer Doan
(74) *Attorney, Agent, or Firm* — Lerner David LLP

(57) ABSTRACT

Modules for spliced cable connections, including a splice platform, splice trays, or splice areas configured for positioning within an enclosure, the platform, trays, or areas providing for splices between cables such that any splice between two cables is physically separated from any other splice between two cables.

5 Claims, 12 Drawing Sheets

(56) References Cited

U.S. PATENT DOCUMENTS

| | | | |
|---|---|---|---|
| 2022/0082773 | A1 | 3/2022 | Sedor et al. |
| 2022/0120989 | A1 | 4/2022 | Takeuchi et al. |

FOREIGN PATENT DOCUMENTS

| | | | |
|---|---|---|---|
| EP | 03992683 | A1 | 5/2022 |
| JP | H11-133251 | A | 5/1999 |
| JP | 2008514988 | A | 5/2008 |
| JP | 2022527890 | A | 6/2022 |
| WO | 2020190717 | A1 | 9/2020 |

OTHER PUBLICATIONS

Extended European Search Report including Written Opinion for Application No. 23207490.6 dated Jun. 17, 2024. 15 pgs.

* cited by examiner

MODULES FOR SPLICED CABLE CONNECTIONS

CROSS-REFERENCE TO RELATED APPLICATIONS

The present application claims the benefit of the filing date of U.S. Provisional Patent Application No. 63/423,991 filed on Nov. 9, 2022, the disclosure of which is hereby incorporated herein by reference.

BACKGROUND

The increasing deployment of electronic and fiber optic networks has given rise to an increasing need to manage the routing of signals in such networks. Often, the routing of signals is managed through the routing of cables associated with the signals and involves the use of multi-port terminals that allow for selective connection between cables at designated points in a network. For example, a source may be connected to a destination by suppling a cable from the source to the terminal and supplying a cable from the destination to the terminal, and then connecting the two cables through ports on the terminal. One such application is in fiber to the home (FTTH) networks, in which a feeder cable from a service provider is connected to a distribution point (or "drop box") and customers are connected to the drop box via service cables.

However, the length of cable needed to connect a source or destination to a terminal may not be known in advance. Thus, the cables for connecting to a terminal are often cut from a large spool of supply cable and then connected at the terminal via splicing. For instance, in an FTTH network the length of cable needed to connect the home of new customer to the nearest existing drop box is not known in advance, and therefore a fiber optic cable for connecting the new customer's home to the drop box is often cut from a large supply and then connected to cables in the box via splicing. Thus, in many applications as the number of connections to a multi-port terminal increases the number of splices that must be housed in the terminal increases commensurately.

BRIEF SUMMARY

It has been recognized that as the number of cable splices housed in a multi-port terminal increases, servicing the terminal without unintentionally disturbing the spliced cables becomes increasingly difficult. For example, when a large number of splices are housed in a terminal, it is difficult to inspect one of the splices, remove one of the splices, or add a splice, without disturbing a cable that is not part of the intended inspection, removal, or addition.

It has been further recognized that providing physical separation of cable splices at a multi-port terminal is highly desirable as it facilitates servicing of the terminal without unintentionally disturbing one or more of the spliced cables.

In light of the desire for physical separation of cable splices at a multi-port terminal the present technology is provided.

In accordance with an aspect of the technology described in this disclosure, the technology provides a module for spliced cable connections, including a splice platform configured for positioning within an enclosure, the splice platform including a plurality of individual cable splice sections, each individual cable splice section having a splice area to accommodate a splice between two cables, wherein the splice areas are physically separated from each other.

In accordance with another aspect of the technology described in this disclosure, the technology provides a module for spliced cable connections, including a splice platform configured for positioning within an enclosure, the splice platform including a plurality of splice trays, each splice tray having a splice area to accommodate a splice between two cables and being movably secured to the splice platform.

In accordance with still another aspect of the technology described in this disclosure, the technology provides a splice unit for a spliced cable connection, including a splice module configured for positioning within an enclosure, the splice module including a first cable anchoring portion for securing to a first cable, a second cable anchoring portion for securing to a second cable, a cable routing portion for routing the first cable and the second cable within the splice module, and a splice protection tube holding portion for accommodating a splice protection tube surrounding a splice between the first cable and the second cable.

BRIEF DESCRIPTION OF THE DRAWINGS

The accompanying drawings are not intended to be drawn to scale. Also, for purposes of clarity not every component may be labeled in every drawing.

DETAILED DESCRIPTION

Examples of systems and methods are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1A:
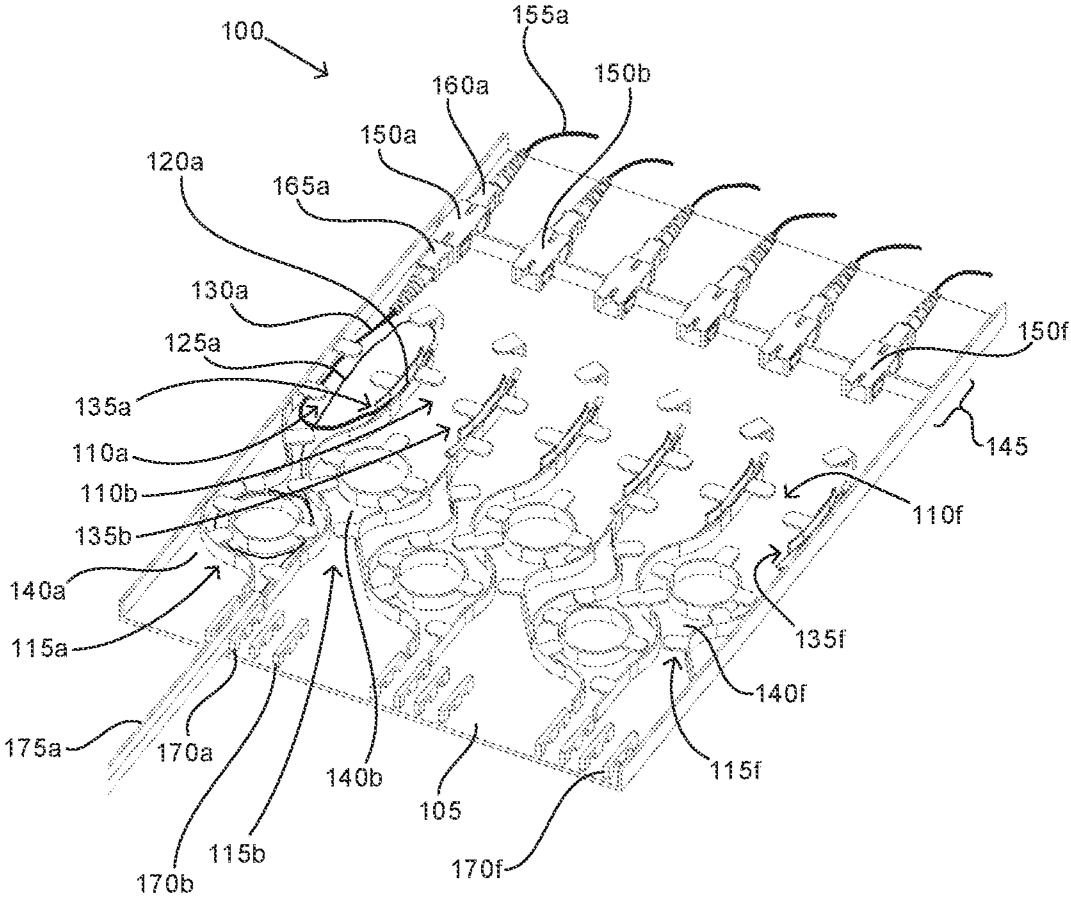
FIG. 1A is a perspective view of a module for spliced cable connections, the module featuring a splice platform having a multiple of physically separated splice areas, and the figure showing one splice area occupied.

FIG. 1A is a perspective view of a module 100 for spliced cable connections. The module 100 includes a splice platform 105 having a multiple of physically separated splice areas 110*a*, 110*b*, 110*c*, 110*d*, 110*e*, and 110*f*, the splice areas 110*a*-110*f* being respectively included in individual cable splice sections 115*a*, 115*b*, 115*c*, 115*d*, 115*e*, and 115*f*. The splice areas 110*a*-110*f* are each configured to accommodate a single splice between two cables. By way of example, FIG. 1A shows splice area 110*a* accommodating a splice 120*a* between a first cable 125*a* (e.g., a "service cable") and a second cable 130*a* (e.g., an "internal cable"). Further, in the FIG. 1A configuration the splice areas 110*a*-110*f* include respective splice holding portions 135*a*, 135*b*, 135*c*, 135*d*, 135*e*, and 135*f* for securing respective splices. For example, the splice 120*a* is secured within splice holding portion 135*a*. Notably, the first cable 125*a* and the second cable 130*a* may be fiber optic cables, the splice 120*a* may be contained within a splice protection tube (not shown), and the splice protection tube may be held within splice holding portion 135*a*.

In any event, the splice areas 110*a*-110*f* are physically separated from each other. By physically separating the splice areas 110*a*-110*f* access to any one of the splice areas (e.g., splice area 110*a*), and its corresponding splice (e.g., splice 120*a*), is facilitated. In particular, such physical separation allows any one of the splices (e.g., splice 120*a*) or spliced cables (e.g., first cable 125*a*/second cable 130*a*) to be accessed without disturbing other splices or other spliced cables (e.g., splices or spliced cables in splice areas 110*b*-110*f*). Thereby, each splice in module 100 may be added, removed, or serviced without interfering with other splices or spliced cables in the module 100.

It should be noted that in the FIG. 1A configuration, the individual cable splice sections 115*a*-115*f* include respective cable storage sections 140*a*, 140*b*, 140*c*, 140*d*, 140*e*, and 140*f* for storing respective excess amounts of cable. For instance, cable storage section 140*a* is used to store an excess amount of first cable 125*a*. Nevertheless, cable storage sections 140*a*-140*f* are optional and the individual cable splice sections 115*a*-115*f* of module 100 may be provided without cable storage sections 140*a*-140*f*.

The module 100 may also include a patch section. An example of a patch section is shown in FIG. 1A as patch section 145. As can be seen from FIG. 1A, the patch section 145 may be configured to secure a multiple of adapters 150*a*, 150*b*, 150*c*, 150*d*, 150*e*, and 150*f*. Each of adapters 150*a*-150*f* may serve to communicatively couple a spliced cable to another cable via cable connection terminals coupled to the adapter. For example, adapter 150*a* is shown communicatively coupling a source cable 155*a* to the second cable 130*a* via a source cable connection terminal 160*a* and a second cable connection terminal 165*a* (e.g., an "internal cable connection terminal"). That is, an end of source cable 155*a* is secured within source cable connection terminal 160*a*, an end of second cable 130*a* is secured within second cable connection terminal 165*a*, and the end of source cable 155*a* is communicatively coupled to the end of second cable 130*a* when the communication terminals 160*a* and 165*a* are inserted in adapter 150*a*.

Incidentally, it is noted that prior to creating the splice 120*a* of FIG. 1A, second cable 130*a* may be provided with the second cable connection terminal 165*a* attached to one end of the second cable 130*a*, the combined second cable 130*a* and attached second cable connection terminal 165*a* being referred to as an internal cable assembly. As an option, the module 100 may be provided with one or more of such internal cable assemblies.

As another option, the module 100 may include one or more cable fixing sections. To illustrate, the configuration of FIG. 1A shows module 100 including a multiple of cable fixing sections 170*a*, 170*b*, 170*c*, 170*d*, 170*e*, and 170*f*, corresponding to respective ones of individual cable splice sections 115*a*-115*f*. Each of the cable fixing sections 170*a*-170*f* is configured to secure an external cable, such as a service cable, and route the external cable or a cable stemming from the external cable to the corresponding individual cable splice section. For example, in the FIG. 1A illustration, cable fixing section 170*a* is configured to secure an external cable 175*a* via compression fit such that first cable 125*a*, stemming from external cable 175*a*, is readily routed to cable storage section 140*a* of individual cable splice section 115*a*.

Figure 1B:
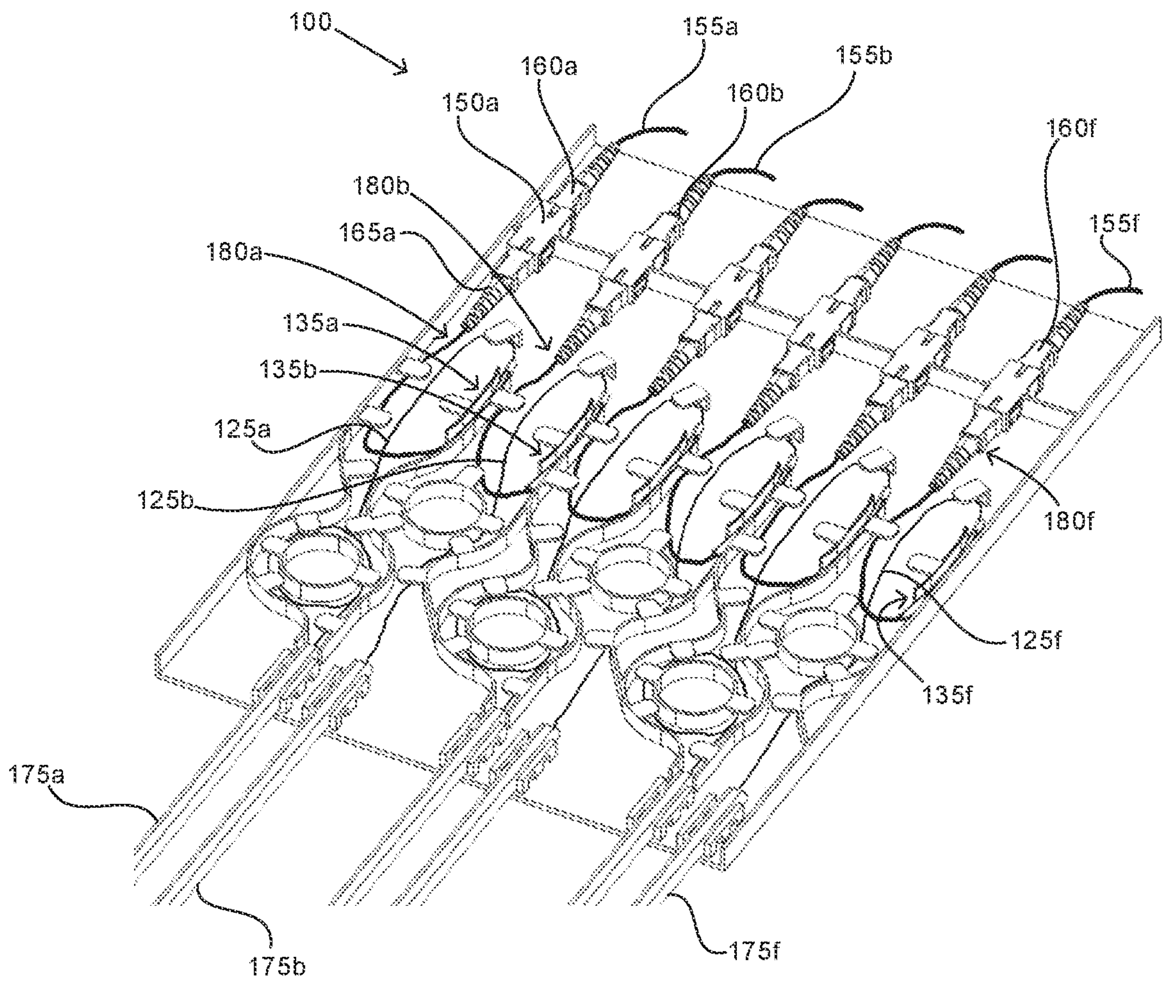
FIG. 1B is a perspective view of the module of FIG. 1A with all of the splice areas occupied.

Turning now to FIG. 1B, the figure is a perspective view of the module 100 of FIG. 1A with all of the splice areas 110*a*-110*f* occupied. In FIG. 1B, source cables 155*a*, 155*b*, 155*c*, 155*d*, 155*e*, and 155*f* may be split from a single feeder cable (not shown) and communicatively coupled to respective internal cable assemblies 180*a*, 180*b*, 180*c*, 180*d*, 180*e*, and 180*f* which are, in turn, spliced to service cables 125*a*, 125*b*, 125*c*, 125*d*, 125*e*, and 125*f*. The service cables 125*a*-125*f* respectively stem from external cables 175*a*, 175*b*, 175*c*, 175*d*, 175*e*, and 175*f*, and the splices between the service cables 125*a*-125*f* and the internal cable assemblies 180*a*-180*f* are respectively secured within splice holding portions 135*a*-135*f*. Further, the external cable assemblies 175*a*-175*f* are secured to the module 100 by respective ones of cable fixing sections 170*a*-170*f*.

It should be noted that while FIGS. 1A and 1B shows the module 100 including six splice areas (splice areas 110*a*-1100, and six of each attendant element, the embodiments are not limited to modules having six splice areas, and the six splice areas of FIGS. 1A and 1B are provided merely for purposes of illustration.

Figure 2A:
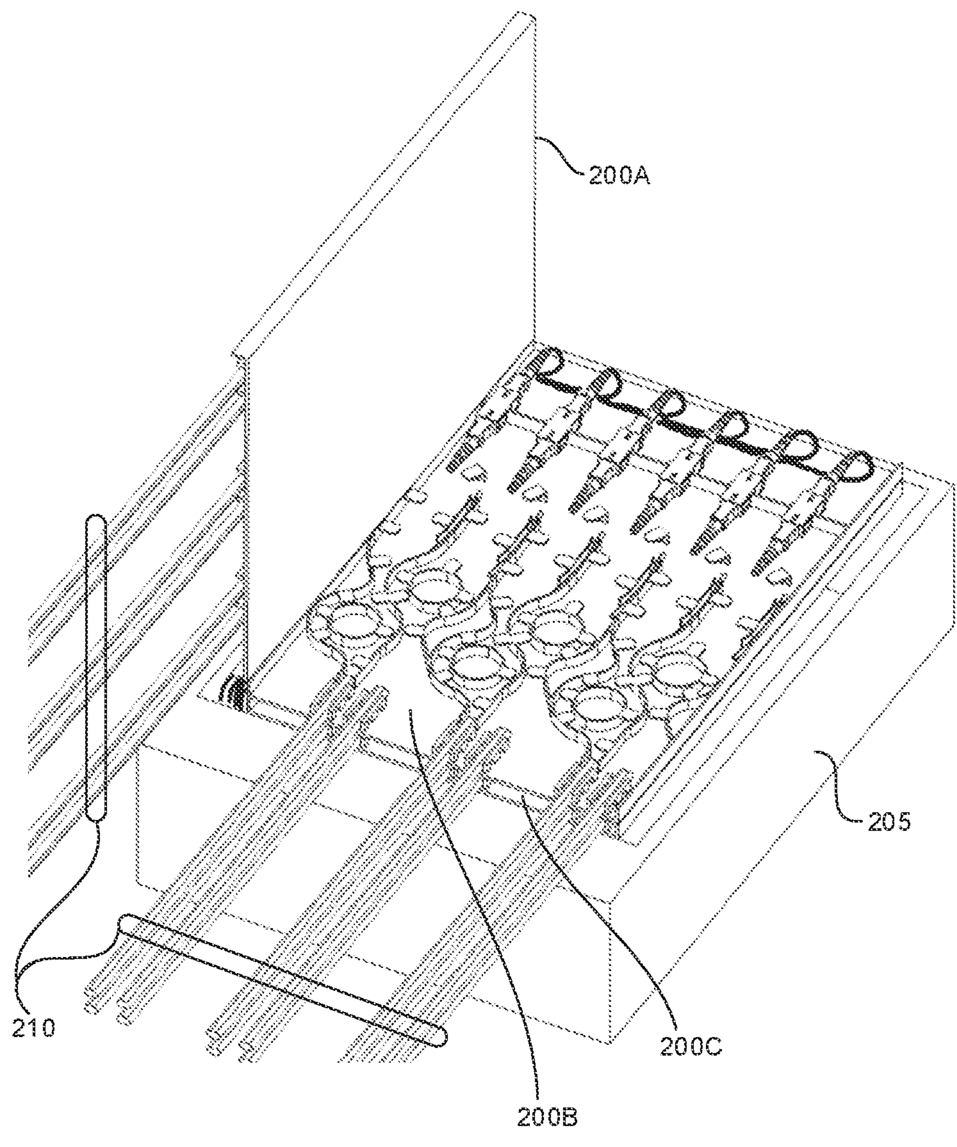
FIG. 2A is a perspective view showing a configuration in which a multiple of FIG. 1A modules are used with an enclosure.

FIG. 2A is a perspective view showing a configuration in which a multiple of modules 200A, 200B, and 200C are employed with an enclosure 205. Each of modules 200A-200C may take the form of, for example, module 100 of FIG. 1A. Regarding the enclosure 205, only a bottom portion is shown. In practice, the enclosure 205 may include a top portion that mates with the bottom portion to enclose the modules 200A-200C in a manner that allows external cables 210 to enter the enclosure 205 yet provides a water-tight seal between the external cables 210 and the enclosure 205. As can be seen from FIG. 2A, the modules 200A-200C are secured within the enclosure 205 such that each of modules 200A-200C may be individually rotated along a lengthwise edge of the module to facilitate access to the other modules.

In the figure, module 200A is rotated along a lengthwise edge of module 200A to provide access to module 200B.

Figure 2B:
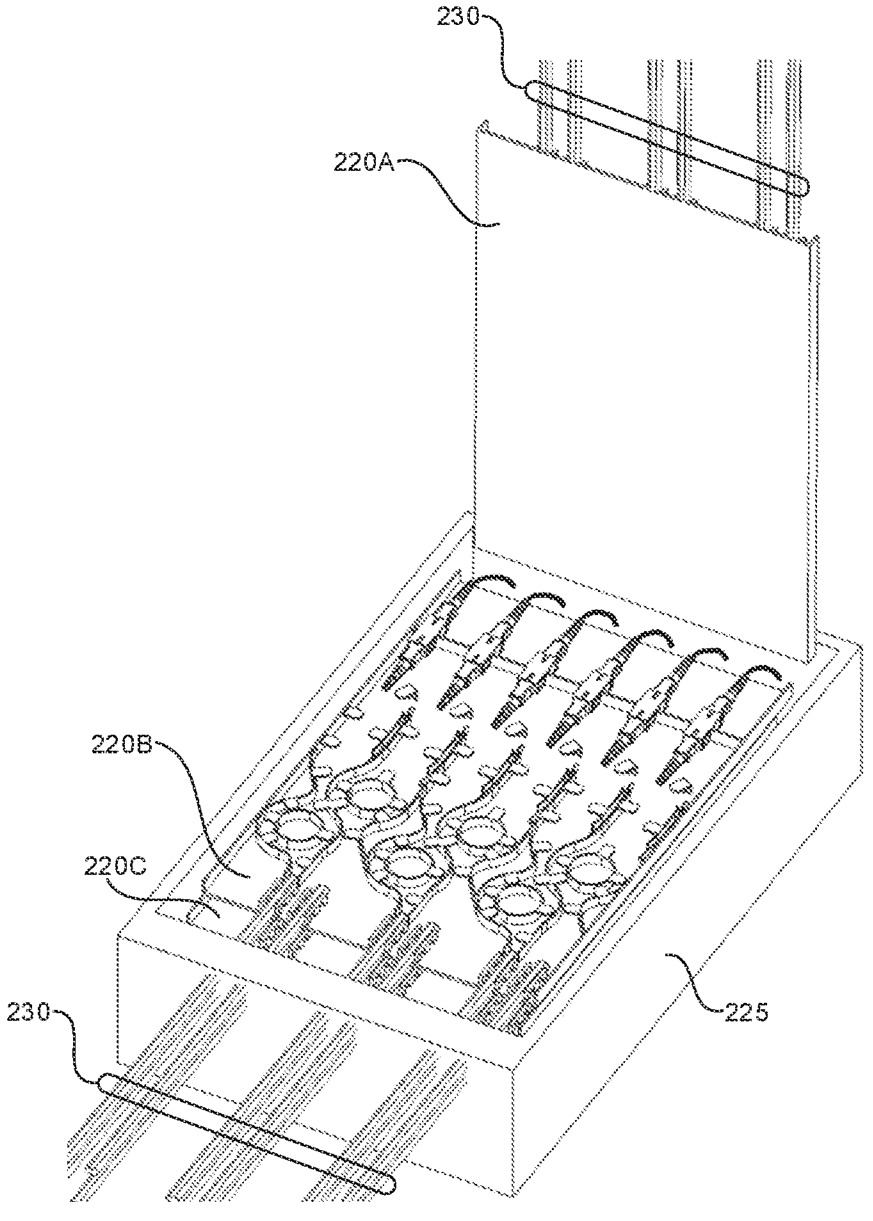
FIG. 2B is a perspective view showing an alternative configuration in which a multiple of FIG. 1A modules are used with an enclosure.

FIG. 2B is a perspective view showing an alternative configuration in which a multiple of modules 220A, 220B, and 220C are employed with an enclosure 225. Each of modules 220A-220C may take the form of, for example, module 100 of FIG. 1A. Regarding the enclosure 225, only a bottom portion is shown. In practice, the enclosure 225 may include a top portion that mates with the bottom portion to enclose the modules 220A-220C in a manner that allows external cables 230 to enter the enclosure 225 yet provides a water-tight seal between the external cables 230 and the enclosure 225. As can be seen from FIG. 2B, the modules 220A-220C are secured within the enclosure 225 such that each of the modules 220A-220C may be individually rotated along a widthwise edge to facilitate access to the other modules. In the figure, module 220A is rotated along a widthwise edge of module 220A to provide access to module 220B.

It should be noted that while FIGS. 2A and 2B depict configurations showing three modules, the embodiments are not limited to configurations having three modules, and the three modules in each of FIGS. 2A and 2B are provided merely for purposes of illustration.

Figure 3A:
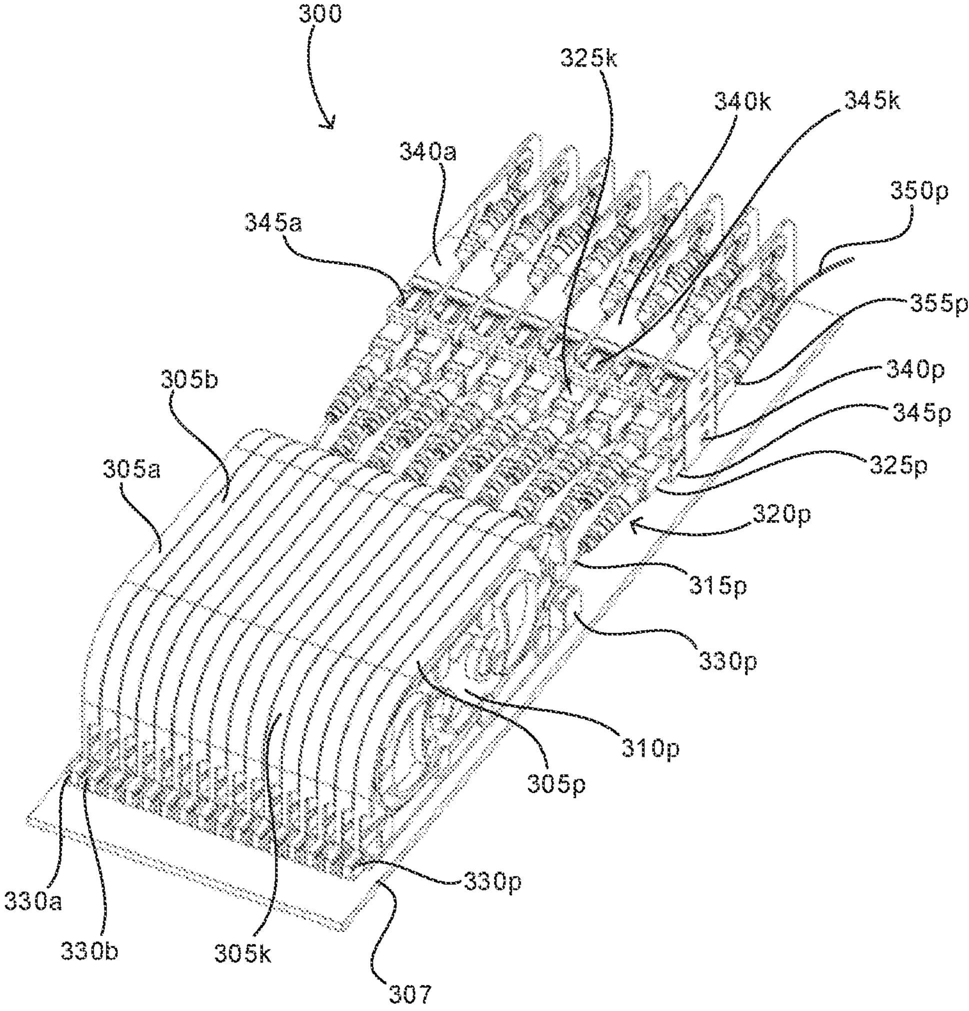
FIG. 3A is a perspective view of a module for spliced cable connections, the module featuring a multiple of splice trays removably secured to a splice platform.

FIG. 3A, is a perspective view of a module 300 for spliced cable connections. The module 300 features a multiple of splice trays 305*a*, 305*b* . . . 305*k* . . . 305*p* removably secured to a splice platform 307. Each of the splice trays 305*a*-305*k* has a splice area (e.g., splice area 310*p*). The splice areas are configured to accommodate a splice between two cables. For example, splice area 310*p* is configured to accommodate a splice between a first cable 315*p* (e.g., an "internal cable") and a second cable (not shown). The first cable 315*p* may be part of an internal cable assembly 320*p*, which includes the first cable 315*p* and a first cable connection terminal 325*p* coupled to an end of the first cable 315*p*. In any event, the splice areas are physically separated from one another due to the structure of the splice trays and the arrangement of the spice trays when positioned in the splice platform 307.

To secure the splice trays in the splice platform 307, a multiple of splice tray fixing sections 330*a*, 330*b* . . . 330*k* . . . 330*p* may be provided. In the FIG. 3A embodiment, the splice tray fixing sections 330*a*-330*p* are formed to provide a compression fit or snap fit for the splice trays 305*a*-305*k* so that the splice trays 305*a*-305*k* are removable from the splice tray fixing sections 330*a*-330*p*.

In addition, module 300 may include a multiple of port holders 340*a*, 340*b* . . . 340*k* . . . 340*p*. The port holders 340*a*-340*p* may be removably, or movably, secured to the splice platform 307, and may hold respective adapters 345*a*, 345*b* . . . 345*k* . . . 345*p*. The adapters 345*a*-345*p* may, in turn, connect to respective pairs of cable connection terminals to communicatively couple cables terminated by the cable connection terminals. For example, adapter 345*p* is shown communicatively coupling a source cable 350*p* to the first cable 315*p* via a source cable connection terminal 355*p* and the first cable connection terminal 325*p* (e.g., an "internal cable connection terminal"). That is, an end of source cable 350*p* is secured within source cable connection terminal 355*p*, an end of first cable 315*p* is secured within first cable connection terminal 325*p*, and the end of source cable 350*p* is communicatively coupled to the end of first cable 315*p* when the source cable connection terminal 355*p* and first cable connection terminal 325*p* are inserted in adapter 345*p*.

Figure 3B:
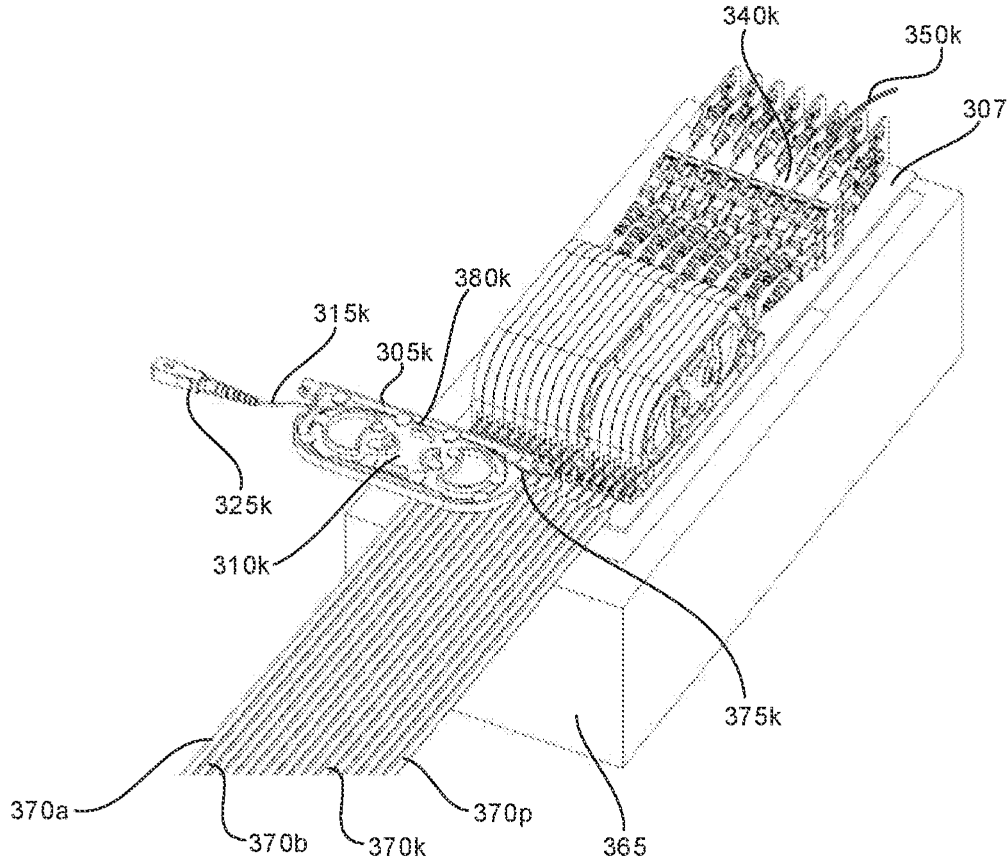
FIG. 3B is a perspective view of the module of FIG. 3A used with an enclosure and with one of the splice trays removed from the splice platform.

Referring now to FIG. 3B, the figure is a perspective view of the module 300 of FIG. 3A used with an enclosure 365 and with splice tray 305*k* removed from the splice platform 307. Regarding the enclosure 365, only a bottom portion is shown. In practice, the enclosure 365 may include a top portion that mates with the bottom portion to enclose the module 300 in a manner that allows external cables 370*a*, 370*b* . . . 370*k* . . . 370*p* to enter the enclosure 365 yet provides a water-tight seal between the external cables 370*a*-370*p* and the enclosure 365.

As can be seen from FIG. 3B, splice area 310*k* accommodates a splice 380*k* between the internal cable 315*k* and a service cable 375*k* stemming from external cable 370*k*. In this manner the module 300 may provide a communicative coupling between a source cable 350*k* and the service cable 375*k*. As shown, a multiple of similar type communicative couplings may be provided by the module 300. Also, it should be noted that in some embodiments the module 300 is used to make communicative couplings between fiber optic source cables and fiber optic service cables. Accordingly, by way of example, source cable 350*k*, internal cable 315*k*, and service cable 375*k* may be fiber optic cables.

Figure 3C:
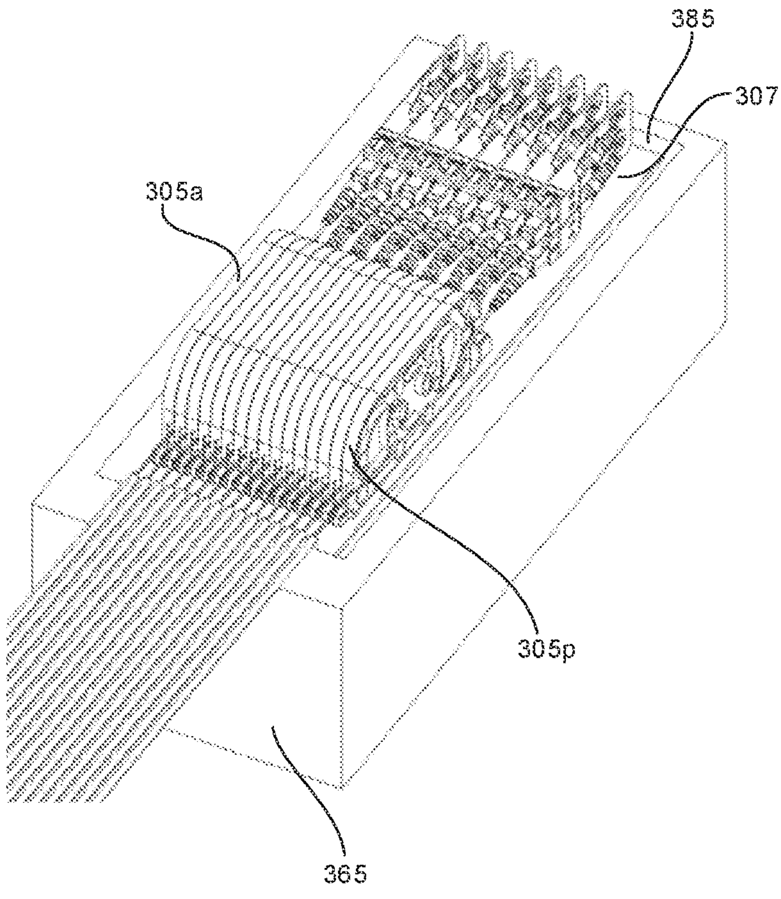
FIG. 3C is a perspective view of the module of FIG. 3A used with an enclosure and with none of the splice trays removed from the splice platform.

FIG. 3C is a perspective view of the module 300 of FIG. 3A used with enclosure 365 and with none of the splice trays 305*a*-305*p* removed from the splice platform 307. In FIG. 3C the module 300 is seated in a receiving area 385 of the enclosure 365.

It should be noted that while FIGS. 3A-3C show the module 300 including sixteen splice trays (splice trays 305*a*-305*p*), and sixteen of each attendant element, the embodiments are not limited to modules having sixteen splice trays, and the sixteen splice trays of FIGS. 3A-3C are provided merely for purposes of illustration.

Figure 4A:
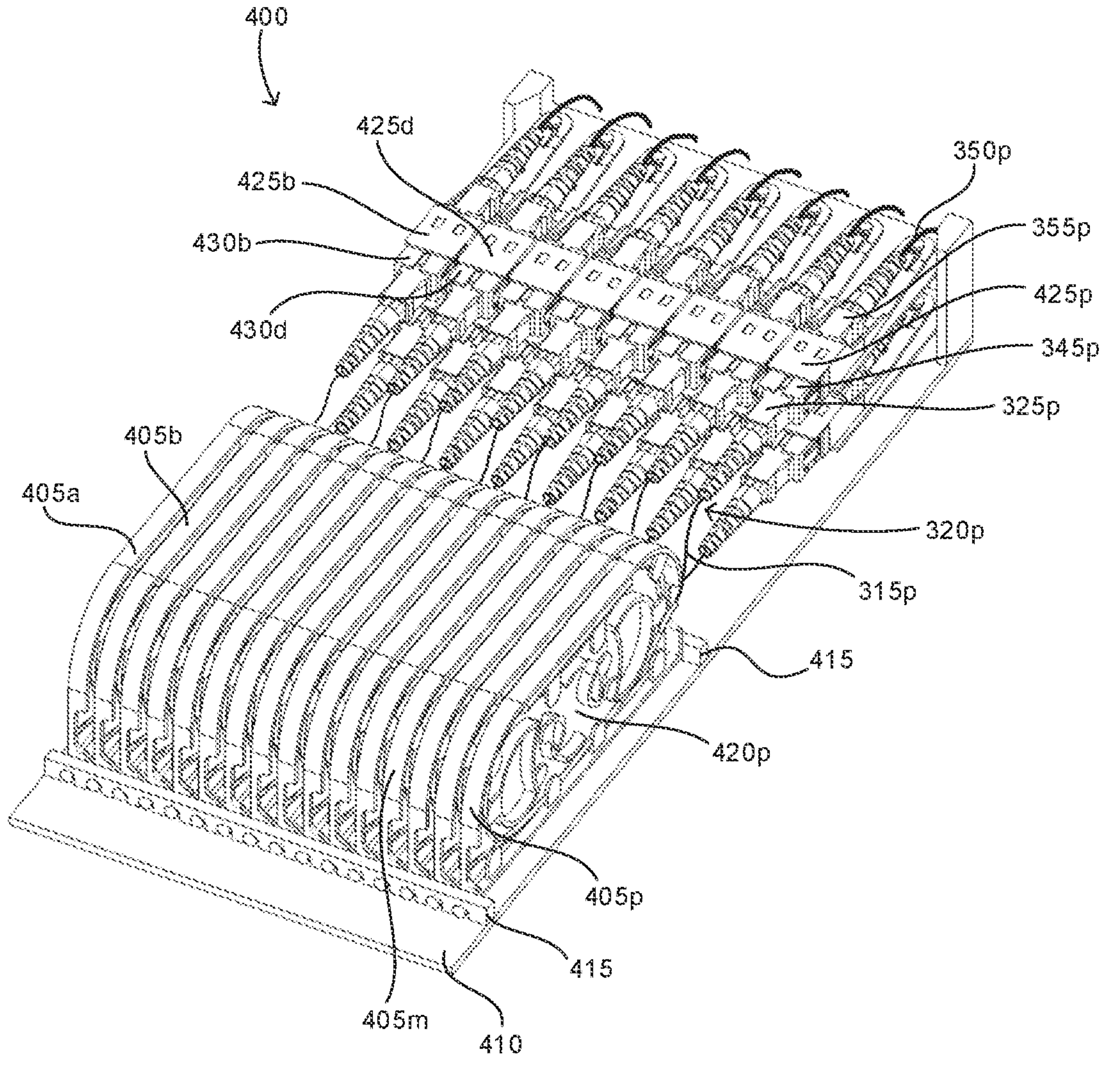
FIG. 4A is a perspective view of a module for spliced cable connections, the module featuring a multiple of splice trays rotatably secured to a splice platform.

FIG. 4A is a perspective view of a module 400 for spliced cable connections. The module 400 features a multiple of splice trays 405*a*, 405*b* . . . 405*m* . . . 405*p* rotatably secured to a splice platform 410. The module 400 is similar to module 300 in many ways, but notably differs from module 300 with respect to the manner in which the splice trays 405*a*-405*p* are secured to the splice platform 410. More particularly, module 400 includes a fixing section 415 for rotatably securing splice trays 405*a*-405*p* to the splice platform 410. Further, the splice trays 405*a*-405*p* are configured to mate with the fixing section 415 such that the splice trays 405*a*-405*p* can each independently rotate about a lengthwise side. By allowing the splice trays 405*a*-405*p* to independently rotate, access to the splice trays 405*a*-405*p* is facilitated.

Like the splice trays 305*a*-305*p* of module 300, each of the splice trays 405*a*-405*p* of module 400 has a splice area (e.g., splice area 420*p*). The splice areas are configured to accommodate a splice between two cables. For example, splice area 420*p* is configured to accommodate a splice between first cable 315*p* (e.g., an "internal cable") and a second cable (not shown). The first cable 315*p* may be part of an internal cable assembly 320*p*, which includes the first cable 315*p* and the first cable connection terminal 325*p* coupled to an end of the first cable 315*p*. In any event, the splice areas are physically separated from one another due to the structure of the splice trays and the arrangement of the spice trays when positioned in the splice platform 410.

In addition, module 400 may include a multiple of port holders 425*a*, 425*b* . . . 425*m* . . . 425*p*. The port holders 425*a*-425*p* may be removable from the splice platform 410 or movable within the splice platform 410 (collectively referred to a "movably secured" to the splice platform 410) and may hold respective adapters 345*a*-345*p*. The adapters 345*a*-345*p* may, in turn, connect to respective pairs of cable connection terminals. For example, adapter 345*p* is shown communicatively coupling a source cable 350$p$ to the first cable 315$p$ via the source cable connection terminal 355$p$ and the first cable connection terminal 325$p$ (e.g., an "internal cable connection terminal"). That is, an end of source cable 350$p$ is secured within source cable connection terminal 355$p$, an end of first cable 315$p$ is secured within first cable connection terminal 325$p$, and the end of source cable 350$p$ is communicatively coupled to the end of first cable 315$p$ when the communication terminals 355$p$ and 325$p$ are inserted in adapter 345$p$.

Figure 4B:
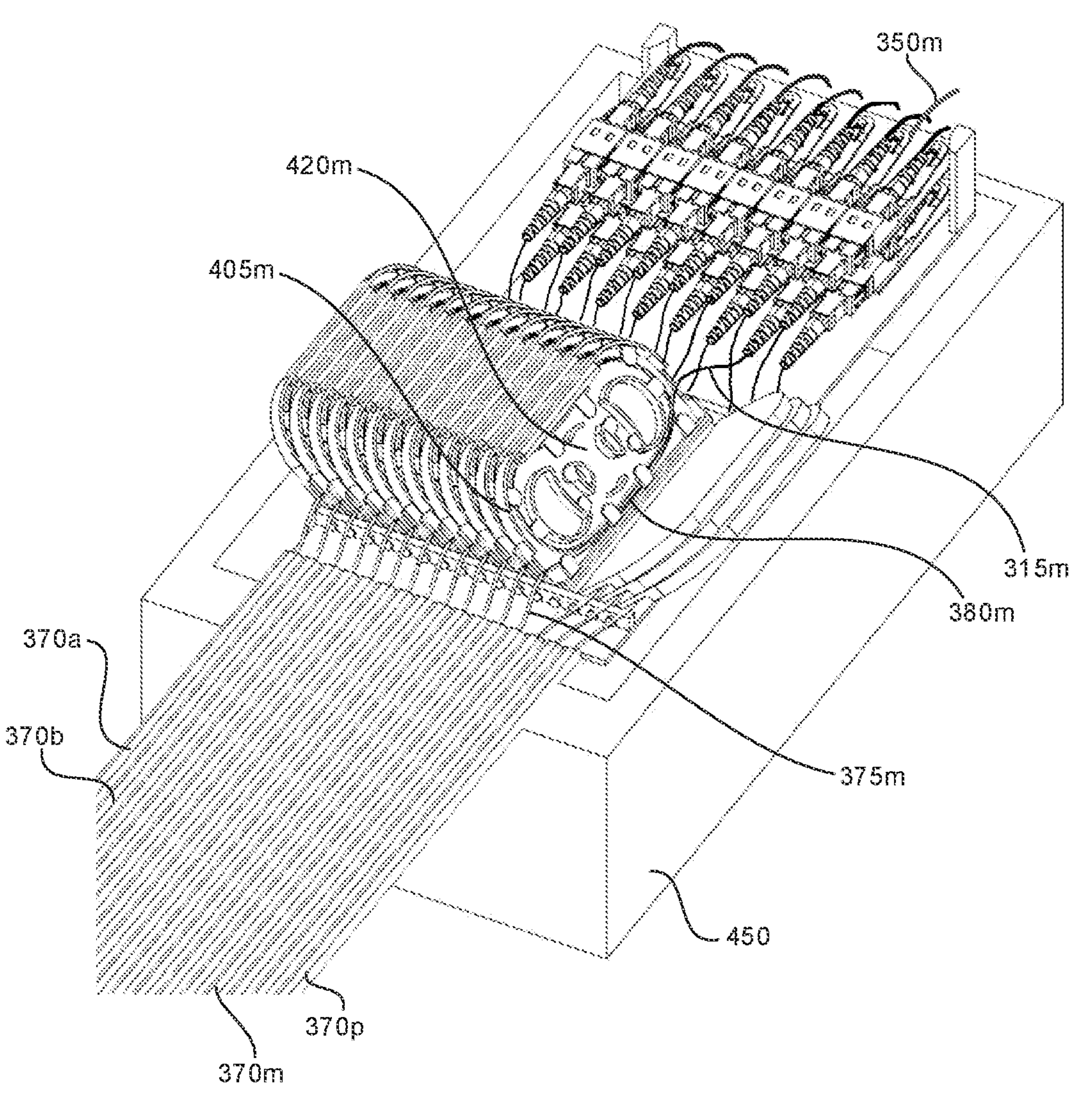
FIG. 4B is a perspective view of the module of FIG. 4A used with an enclosure.

FIG. 4B is a perspective view of the module 400 of FIG. 4A used with an enclosure 450 and with the splice trays 405$a$-405$p$ rotated so as to expose splice area 420$m$ of splice tray 405$m$. Regarding the enclosure 450, only a bottom portion is shown. In practice, the enclosure 450 may include a top portion that mates with the bottom portion to enclose the module 400 in a manner that allows external cables 370$a$, 370$b$ . . . 370$k$ . . . 370$p$ to enter the enclosure 450 yet provides a water-tight seal between the external cables 370$a$-370$p$ and the enclosure 450.

As can be seen from FIG. 4B, splice area 420$m$ accommodates a splice 380$m$ between an internal cable 315$m$ and a service cable 375$m$ stemming from external cable 370$m$. In this manner the module 400 may provide a communicative coupling between a source cable 350$m$ and the service cable 375$m$. As shown, a multiple of similar type communicative couplings may be provided by the module 400. Also, it should be noted that in some embodiments the module 400 is used to make communicative couplings between fiber optic source cables and fiber optic service cables. Accordingly, by way of example, source cable 350$m$, internal cable 315$m$, and service cable 375$m$ may be fiber optic cables.

It should be noted that while FIGS. 4A and 4B show the module 400 including sixteen splice trays (splice trays 405$a$-405$p$), and sixteen of each attendant element, the embodiments are not limited to modules having sixteen splice trays, and the sixteen splice trays of FIGS. 4A and 4B are provided merely for purposes of illustration.

Figure 5:
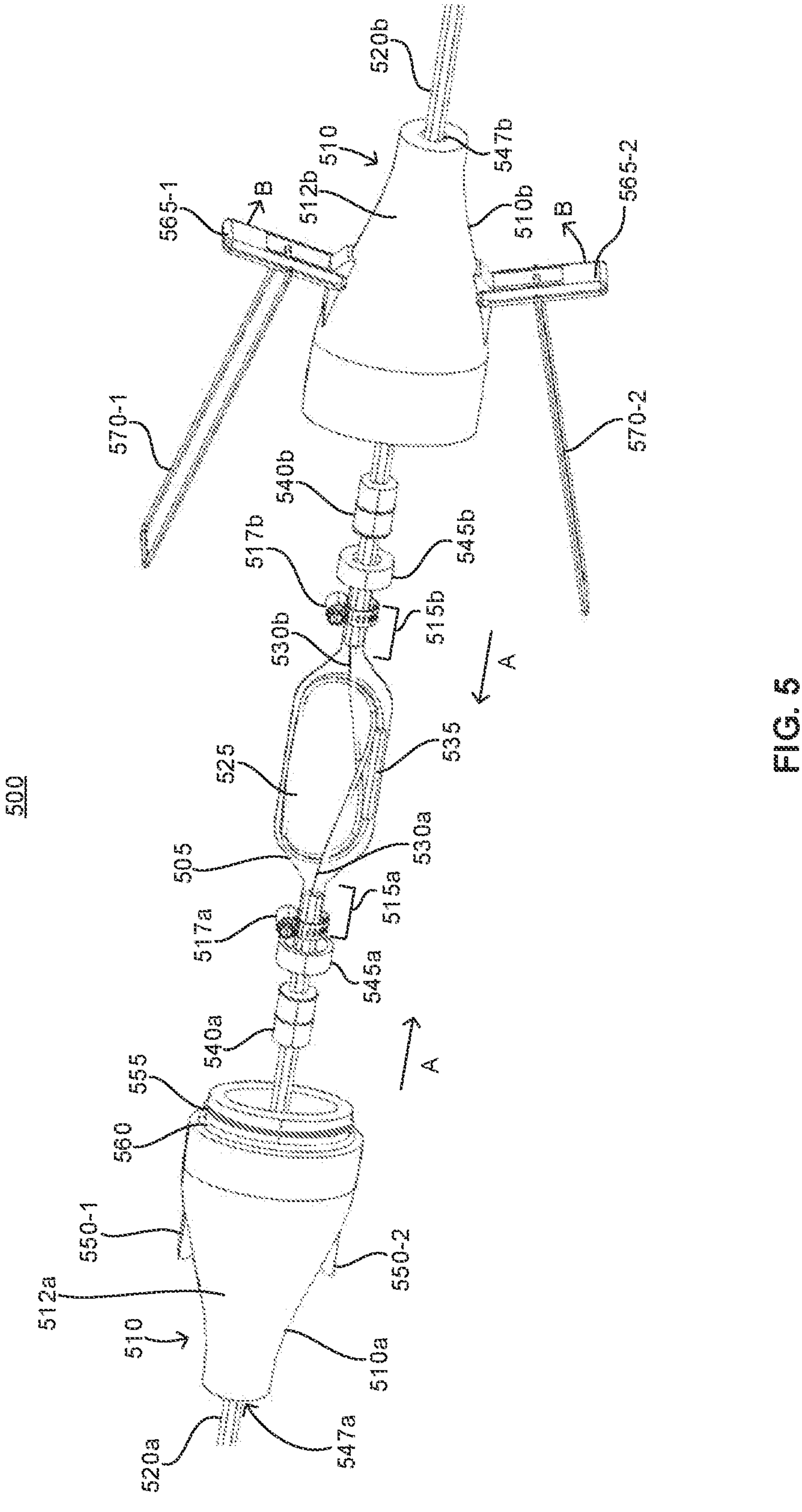
FIG. 5 is a perspective view of an individual splice unit including a splice module and an enclosure, with the enclosure in an open position.

Turning now to FIG. 5, the figure is a perspective view of a splice unit 500 including a splice module 505 and an enclosure 510. The splice module 505 is configured for positioning within the enclosure 510, although the splice module 505 may be used without the enclosure 510. The splice module 505 includes a first cable anchoring portion 515$a$ for securing to a first cable 520$a$ using a first cable anchor 517$a$, and a second cable anchoring portion 515$b$ for securing to a second cable 520$b$ using a second cable anchor 517$b$. Further, the splice module 505 includes a cable routing portion 525. The cable routing portion 525 may be used to route a first stem cable 530$a$ and a second stem cable 530$b$ within the splice module 505, the first stem cable 530$a$ stemming from the first cable 520$a$, and the second stem cable 530$b$ stemming from the second cable 520$b$. As an alternative, the cable routing portion 525 may be used to route the first cable 520$a$ and second cable 520$b$ within the splice module 505, without routing any stem cables.

In any event the cables, routed in the cable routing portion 525 may be spliced together. The resulting splice may be contained within a splice protection tube. To hold the splice protection tube, the splice module 505 may include a splice protection tube holder 535, which may be, for example, integral with the cable routing portion 525 or attached the cable routing portion 525. In the illustration of FIG. 5, the splice protection tube holder 535 holds a splice protection tube (not shown) that protects a splice between first stem cable 530$a$ and second stem cable 530$b$.

Additional elements of the splice unit 500 include a first cable grommet 540$a$, a second cable grommet 540$b$, a first cable grommet stopper 545$a$, and a second cable grommet stopper 545$b$. These elements function with the splice module 505 and enclosure 510 to provide a water-tight seal around splice module 505 when the enclosure 510 is in a closed position.

In FIG. 5, the enclosure 510 is in an open position. As can be seen from the figure, the enclosure 510 includes a first enclosure portion 510$a$ and a second enclosure portion 510$b$. The first enclosure portion 510$a$ has a first body 512$a$ which includes an opening 547$a$ for first cable 520$a$. The first enclosure portion 510$a$ also includes a first catch 550-1, a second catch 550-2, an O-ring 555, and a seal 560. The second enclosure portion 510$b$ has a second body 512$b$ which includes an opening 547$b$ for second cable 520$b$. The second enclosure portion 510$b$ also includes a first lever 565-1, a second lever 565-2, a first latch 570-1, and a second latch 570-2. The first lever 565-1 movably attaches the first latch 570-1 to the second body 512$b$, and the second lever 565-2 movably attaches the second latch 570-2 to the second body 512$b$. To move the enclosure 510 into a closed position, the first enclosure portion 510$a$ and the second enclosure portion 510$b$ are move towards each other, as illustrated by arrows A. Whereupon, the first latch 570-1 is positioned to engage the first catch 550-1, the second latch 570-2 is positioned to engage the second catch 550-2, and the second body 512$b$ is positioned to engage O-ring 555 and seal 560. Then, when levers 565-1 and 565-2 are moved in the directions shown by arrows B, the enclosure 510 is secured in the closed position (see e.g., FIG. 6). Moreover, upon securing enclosure 510 in the closed position, the first cable anchoring portion 515$a$ is urged against the first cable grommet stopper 545$a$ which is, in turn, urged against the first cable grommet 540$a$, thereby compressing the first cable grommet 540$a$ between the first cable grommet stopper 545$a$ and the first body portion 512$a$. In this manner, the compressed first cable grommet 540$a$ provides a water-tight seal between the first body portion 512$a$ and the first cable 520$a$. Similarly, a water-tight seal is provided between second body portion 512$b$ and second cable 520$b$ through action of the second cable anchoring portion 515$b$ and second body portion 512$b$ on second cable grommet stopper 545$b$ and second cable grommet 540$b$.

Figure 6:
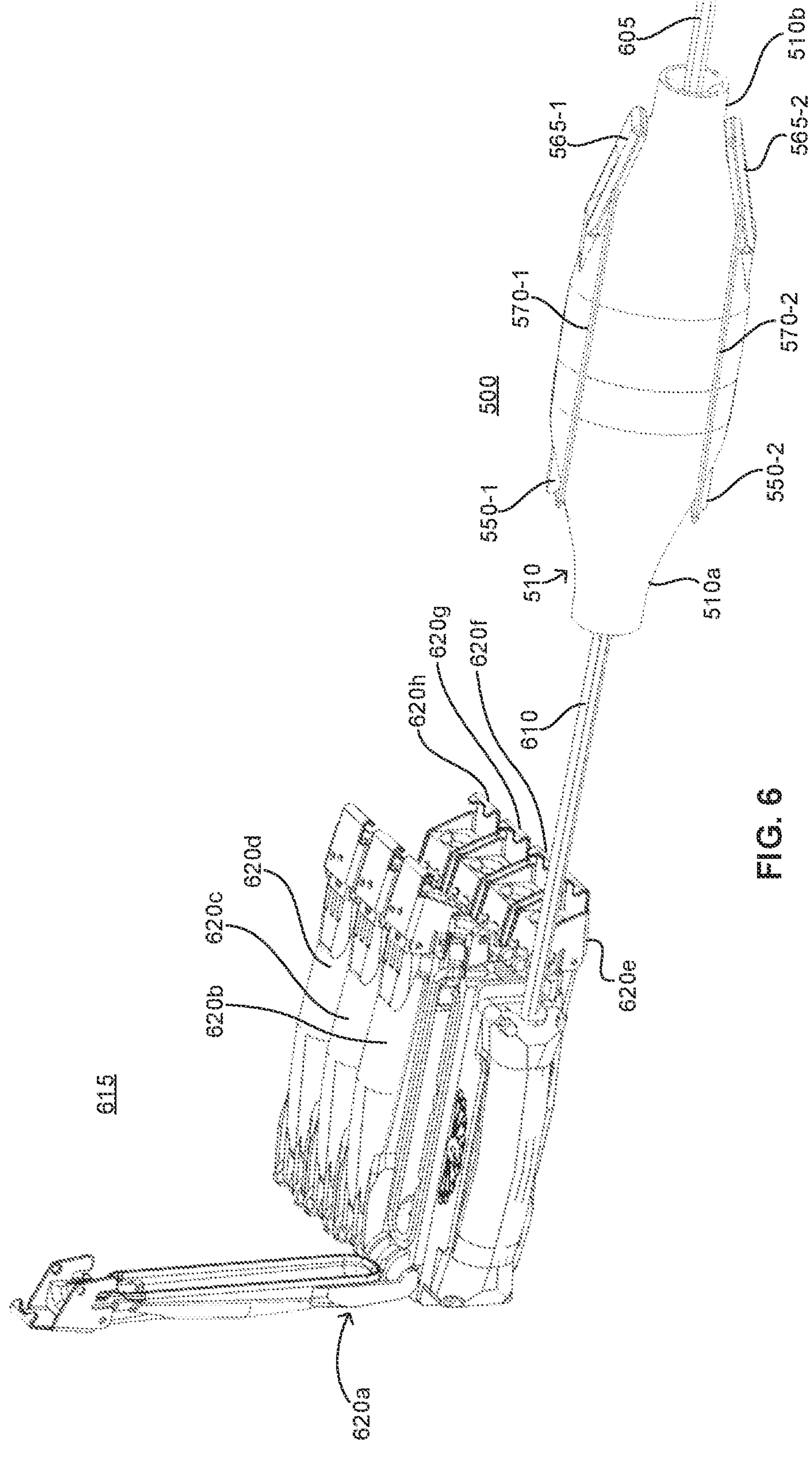
FIG. 6 is a perspective view of the splice unit of FIG. 5 with the enclosure in a closed position and being used to splice a feeder cable to a feeder cable link of a terminal.

FIG. 6 illustrates the splice unit 500 of FIG. 5 in use. FIG. 6 is a perspective view of the splice unit 500 with the enclosure 510 in a closed position, and with the splice unit 500 being used to splice a feeder cable 605 to a feeder cable link 610 of a terminal 615. In terminal 615, a multiple of cables stemming from feeder cable link 610 may be respectively linked to sub-structures 620$a$, 620$b$, 620$c$, 620$d$, 620$e$, 620$f$, 620$g$, and 620$h$ so that they can be communicatively coupled to respective service cables (not shown), each service cable being accommodated in a respective one of the sub-structures 620$a$-620$h$. Sub-structure 620$a$ is shown in the open position to illustrate one possible sub-structure configuration. Providing the splice unit 500 to splice the feeder cable link 610 to the feeder cable 605 is useful in cases where terminal 615 includes a short feeder cable link 610 to facilitate shipping of the terminal, with the expectation that the feeder cable link 610 will be spliced to a feeder cable (e.g., feeder cable 605) on-site.

Figure 7:
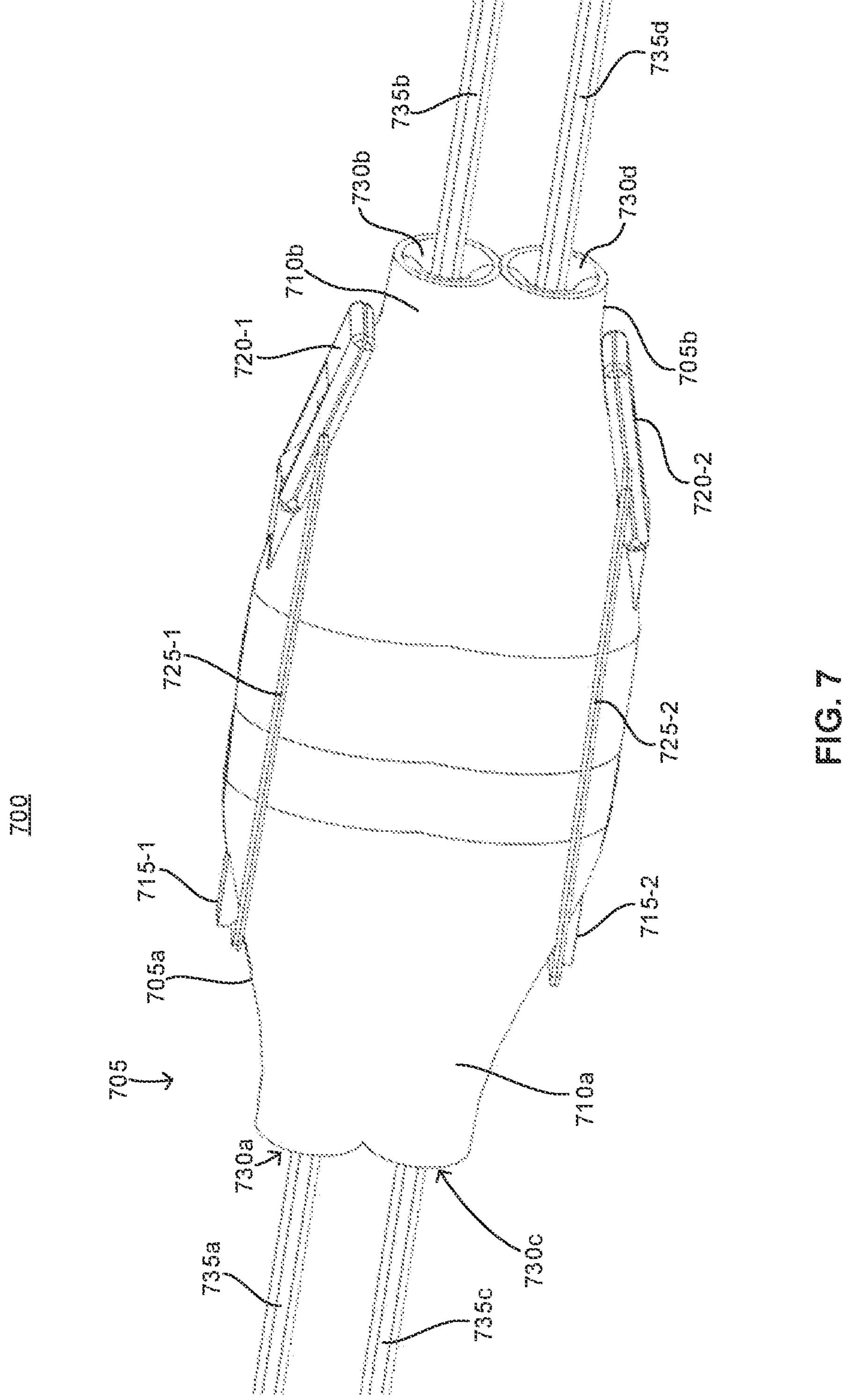
FIG. 7 is a perspective view of a dual splice unit having an enclosure that may be used to house either two physically separated splice modules or a single splice module having two physically separated splice areas.

FIG. 7 is a perspective view of a dual splice unit 700 having an enclosure 705. The dual splice unit 700 includes one or more splice modules housed in the enclosure 705, although the dual splice unit 700 is shown in a closed position in FIG. 7 and therefore no splice module is visible in the figure. By way of example, the one or more splice modules may be a single splice module having a single splice area for accommodating two splices, a single splice module having two physically separated splice areas, or two physically separated splice modules. As can be seen from the figure, the enclosure 705 includes a first enclosure portion 705*a* and a second enclosure portion 705*b*. The first enclosure portion 705*a* has a first body 710*a*, a first catch 715-1, and a second catch 715-2. The second enclosure portion 705*b* has a second body 710*b*, a first lever 720-1, a second lever 720-2, a first latch 725-1, and a second latch 725-2. The first lever 720-1 movably attaches the first latch 725-1 to the second body 710*b*, and the second lever 720-2 movably attaches the second latch 725-2 to the second body 710*b*. To secure the enclosure 705 in a closed position, the first latch 725-1 is secured against the first catch 715-1 by the first lever 720-1, and the second latch 725-2 is secured against the second catch 715-2 by the second lever 720-1.

The enclosure 705 may be similar to the enclosure 510 of FIGS. 5 and 6, but includes four openings 730*a*, 730*b*, 730*c*, and 730*d* instead of the two openings 547*a* and 547*b* of FIGS. 5 and 6. Openings 730*a* and 730*b* are shown accommodating cables 735*a* and 735*b*, while openings 730*c* and 730*d* are shown accommodating cables 735*c* and 735*d*. By way of illustration splice unit 700 may include, inside enclosure 705, two splice modules like splice module 505, two splice tube protection holders like splice protection holder 535, two pairs of cable anchors like cable anchors 517*a* and 517*b*, two pairs of cable grommets like cable grommets 540*a* and 540*b*, and two pairs of cable grommet stoppers like cable grommet stoppers 545*a* and 545*b*. In this manner, dual splice unit 700 may provide for two separated cable splices, one between a stem cable stemming from cable 715*a* and a stem cable stemming from cable 715*b*, and another between a stem cable stemming from cable 715*c* and a stem cable stemming from cable 715*d*. As an alternative, dual splice unit 700 may provide for two separated cable splices by including, inside enclosure 705, a single splice module having two physically separated splice areas. Nevertheless, the dual spice unit 700 may not provide for two separated cable splices and may include, inside enclosure 705, a single splice module having a single splice area for accommodating two cable splices.

Embodiments of the present technology include, but are not restricted to, the following.

(1) A module for spliced cable connections, including a splice platform configured for positioning within an enclosure, the splice platform including a plurality of individual cable splice sections, each individual cable splice section having a splice area to accommodate a splice between two cables, wherein the splice areas are physically separated from each other.

(2) The module according (1), wherein the two cables are fiber optic cables.

(3) The module according to (1), wherein the splice platform further includes a patch section for securing a plurality of adapters, the adapters corresponding to respective ones of the individual cable splice sections.

(4) The module according to (3), further including a plurality of internal cable assemblies, the internal cable assemblies corresponding to respective ones of the splice areas and to respective ones of the adapters, and each internal cable assembly including a first end for positioning in the corresponding splice area, and a second end having a cable connection terminal for coupling to the corresponding adapter.

(5) The module according to (1), wherein the splice platform further includes a plurality of cable fixing sections, the cable fixing sections corresponding to respective ones of the individual cable splice sections, each cable fixing section configured to secure an external cable for routing the external cable to the corresponding individual cable splice section.

(6) A module for spliced cable connections, including a splice platform configured for positioning within an enclosure, the splice platform including a plurality of splice trays, each splice tray having a splice area to accommodate a splice between two cables and being movably secured to the splice platform.

(7) The module according to (6), wherein each splice tray is removable from the splice platform independent of the other splice trays.

(8) The module according to (6), wherein each splice tray is rotatable within the spice platform independent of the other splice trays.

(9) The module according to (6), wherein the two cables are fiber optic cables.

(10) The module according to (6), wherein the splice platform further includes a patch section for securing a plurality of port holders, the port holders corresponding to respective ones of the splice trays.

(11) The module according to (10), wherein each port holder is movably secured to the splice platform.

(12) The module according to (10), further including a plurality of internal cable assemblies, the internal cable assemblies corresponding to respective ones of the splice trays and to respective ones of the port holders, and each internal cable assembly including a first end for positioning in the corresponding splice tray, and a second end having a cable connection terminal for coupling to an adapter in the corresponding port holder.

(13) A splice unit for a spliced cable connection, including a splice module configured for positioning within an enclosure, the splice module including a first cable anchoring portion for securing to a first cable, a second cable anchoring portion for securing to a second cable, a cable routing portion for routing the first cable and the second cable within the splice module, and a splice protection tube holding portion for accommodating a splice protection tube surrounding a splice between the first cable and the second cable.

(14) The splice unit according to (13), further including a first cable grommet and a first cable grommet stopper for providing a first water-tight seal between the first cable and the enclosure, and a second cable grommet and a second cable grommet stopper for providing a second water-tight seal between the second cable and the enclosure.

(15) The splice unit according to (14), wherein the first water-tight seal is created by compressing the first cable grommet between the first cable grommet stopper and the enclosure, and the second water-tight seal is created by compressing the second cable grommet between the second cable grommet stopper and the enclosure.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A splice unit for a spliced cable connection, comprising a splice module configured for positioning within an enclosure, the splice module including a first cable anchoring portion for securing to a first cable, a second cable anchoring portion for securing to a second cable, a cable routing portion for routing the first cable and the second cable within the splice module, and a splice protection tube holding portion for accommodating a splice protection tube surrounding a splice between the first cable and the second cable, wherein the splice unit further comprises a first cable grommet and a first cable grommet stopper for providing a first water-tight seal between the first cable and the enclosure, and a second cable grommet and a second cable grommet stopper for providing a second water-tight seal between the second cable and the enclosure, wherein the enclosure comprises a first enclosure portion having a first body with an opening for the first cable, and a second enclosure portion having a second body with an opening for the second cable;

wherein when the first enclosure portion and the second enclosure portion move toward each other to engage to form the enclosure within which the splice module is positioned, the first water-tight seal is created by urging the first cable anchoring portion against the first cable grommet stopper which is, in turn, urged against the first cable grommet, thereby compressing the first cable grommet between the first cable grommet stopper and the first enclosure portion, and wherein when the first enclosure portion and the second enclosure portion move toward each other to engage to form the enclosure within which the splice module is positioned, the second water-tight seal is created by urging the second cable anchoring portion against the second cable grommet stopper which is, in turn, urged against the second cable grommet, thereby compressing the second cable grommet between the second cable grommet stopper and the second enclosure portion.

2. The splice unit according to claim 1, further comprising the enclosure.

3. The splice unit according to claim 1, wherein the first enclosure portion comprises a catch, and the second enclosure portion comprises a lever and a latch, the lever movably attaching the latch to the second body, and wherein the first enclosure portion and second enclosure portion are configured for mating to one another by positioning the catch and latch to engage with one another and moving the lever to secure the catch to the latch.

4. The splice unit according to claim 1, wherein at least one of the first enclosure portion or the second enclosure portion comprises an O-ring.

5. The splice unit according to claim 1, wherein the first body has first multiple openings, including the opening for the first cable; and the second body has second multiple openings, including the opening for the second cable.

* * * * *